Patented July 2, 1929.

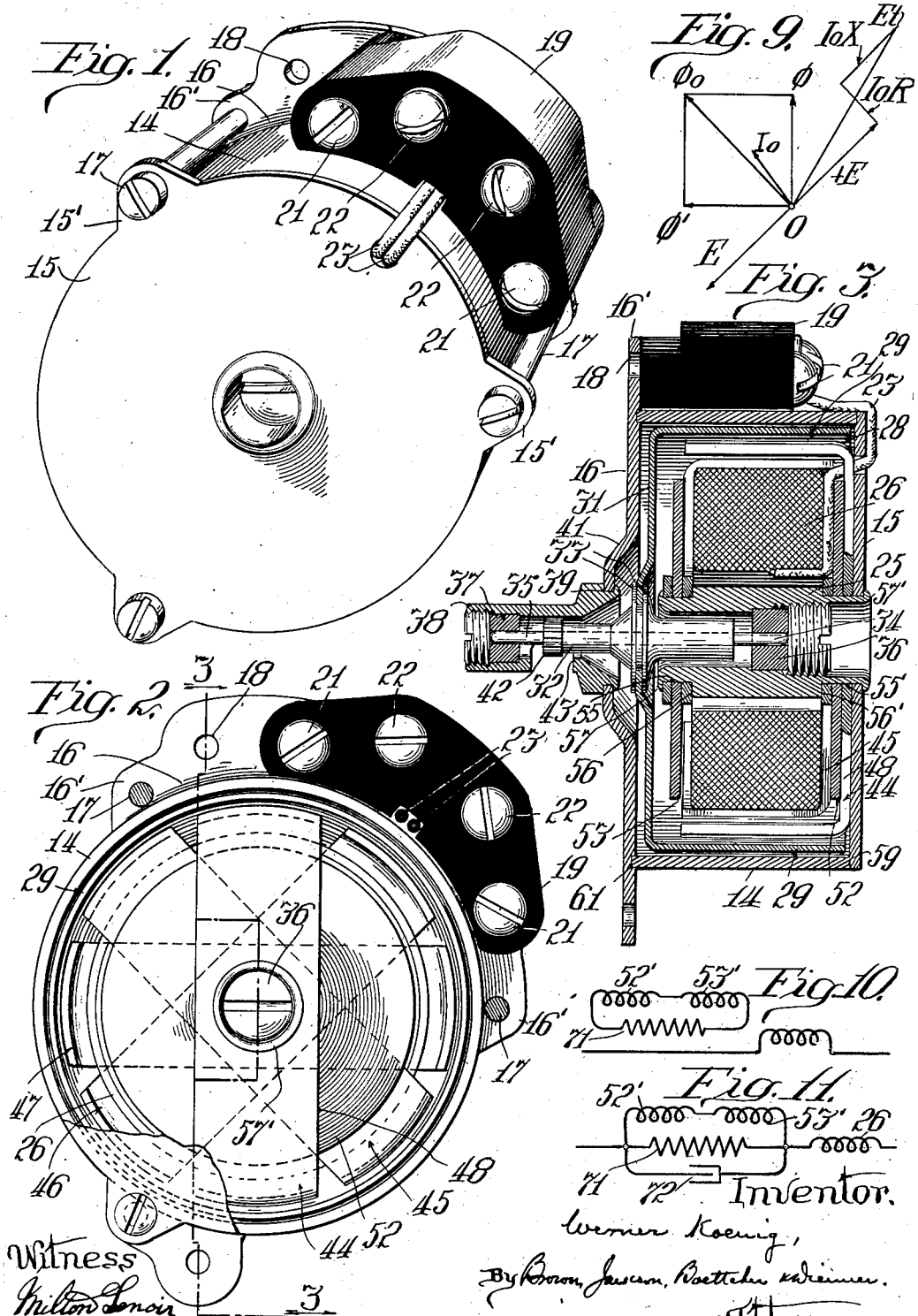

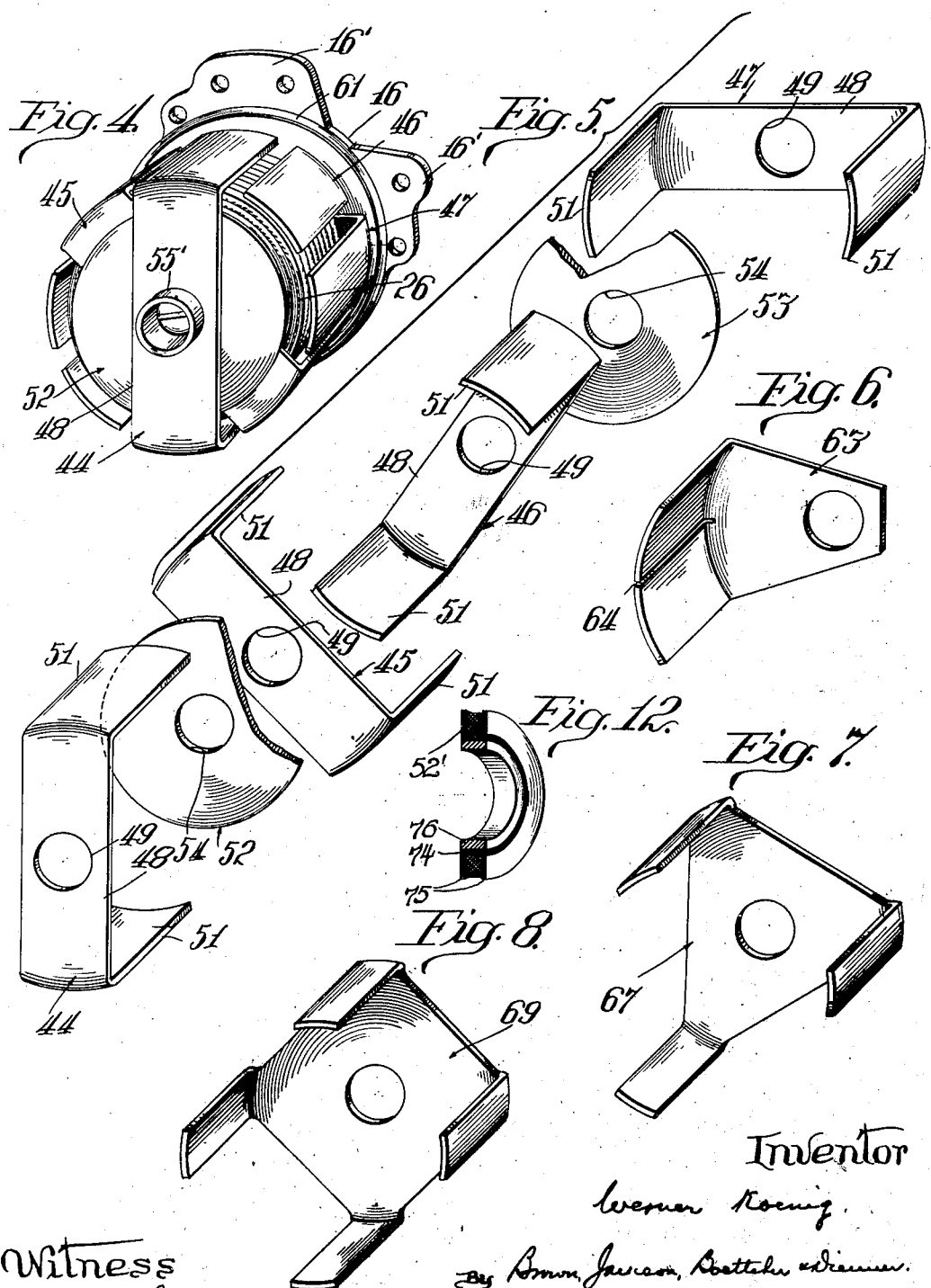

1,719,058

UNITED STATES PATENT OFFICE.

WERNER KOENIG, OF SPRINGFIELD, ILLINOIS, ASSIGNOR TO SANGAMO ELECTRIC CO., OF SPRINGFIELD, ILLINOIS, A CORPORATION OF ILLINOIS.

INDUCTION MOTOR.

Application filed May 14, 1928. Serial No. 277,617.

My invention relates to alternating current motors and has particular reference to motors of this type operating on the well known induction principle. The general aim of the invention is to provide a motor of simple construction in which the stator can be made with a relatively large number of poles for the purpose of producing a low initial speed of the rotor for any given frequency of the alternating current supplied. Motors constructed in accordance with the present invention may be designed for various free-running speeds so as to be applicable to various uses, but they are particularly useful where a small self-starting singlephase induction motor is desired such as for the operation of phonographs and electric clocks, where low speed, medium torque and extremely quiet operation are practically essential. The particular motor which I have illustrated as an exemplary embodiment of the invention is designed to be used for the winding of electric clocks, or for performing similar operations, but it will be understood that the invention is not limited thereto.

In the accompanying drawings illustrating such embodiment:

Fig. 1 is a perspective view of the motor as viewed from one end;

Fig. 2 is an elevational view of this same end of the motor, a portion of the end plate being broken away to illustrate the interior construction;

Fig. 3 is a longitudinal sectional view taken approximately on the plane of the line 3—3 of Fig. 2;

Fig. 4 is a perspective view illustrating the assembly of the stampings which make up the poles of the stator;

Fig. 5 is a perspective exploded view illustrating the relation of these same stampings prior to assembly;

Fig. 6 is a perspective view of one of the stampings such as is employed when the stator is to have only two poles;

Figs. 7 and 8 are similar views illustrating the design of the stampings employed when the stator is to have either six or eight poles respectively;

Fig. 9 is a vector diagram illustrating the preferred relation of phase displacement between the magnetic fields for the production of the driving torque in the rotor;

Figs. 10 and 11 are circuit diagrams illustrating different methods of securing phase displacement to the end of improving the torque characteristics of the motor; and Fig. 12 is an enlarged sectional view in perspective illustrating the preferred form that the coils of Figs. 10 and 11 will assume in adapting the same to the motor.

The casing of the motor comprises a cylindrical metallic shell 14 to the opposite ends of which are secured end plates 15 and 16, the latter being clamped to the ends of the cylindrical shell 14 by clamping screws 17 which pass through apertured ears 15' extending from the plate 15 and which thread into tapped openings in lugs or ears 16' extending from the other plate 16. The cylindrical shell 14 constitutes part of the stator of the motor, being composed of a magnetic material so that it will serve as a magnetic return path, as will be presently described. The two end plates 15 and 16 are composed of non-magnetic material. The casing of the motor may be provided with any suitable base structure for supporting the motor, but in the clock winding embodiment which I have shown, the end plate 16 has apertures 18 formed in its lugs or ears 16' for fastening the motor to a mounting plate or the like in the clock structure. For convenience of reference I shall hereinafter refer to the plate 16 as the rear or back plate, and to the plate 15 as the front plate. It will be observed from Figure 3 that the rotor shaft of the motor is extended out through the back plate 16 for establishing a connection with the element to be driven at a point in rear of the mounting plate, but it will be understood that this relation can be reversed, viz, the armature shaft can be extended out through the front plate 15 if desired. A suitable terminal block 19 is fastened by screws 21 to the lugs 16' projecting from the back plate 16, this terminal block having connector terminals 22 mounted therein and adapted for connection to the supply line.

Two wires 23 lead from the connector terminals to the winding of the motor, preferably passing to said winding through a hole in the front plate 15, as clearly shown in Figure 1.

Referring to Figure 3, it will be seen that the front plate 15 rigidly supports a sleeve-like boss 25 which is disposed centrally of the outer cylindrical shell 14. This boss is composed of a magnetic metal since it is to function as a magnetic core for the stator. The stator also comprises a coil 26 and a series of stampings which embrace the coil and constitute a series of magnetic poles adapted to cooperate with the rotor. The coil 26 consists of a relatively large number of turns of wire, mounted on the magnetic core 25, and with the opposite ends of the coil suitably connected to the terminal wires 23. The peripheral surface of the coil 26 is cylindrical, and the series of stampings which define the poles of the stator closely embrace this cylindrical surface. The construction of these stampings will be hereinafter described.

An annular air gap 28 is defined between the outer surfaces of these poles and the inner surface of the cylindrical shell or return element 14. Rotating in this air gap is a cup-shaped rotor 29, preferably composed of copper or aluminum. The web portion 31 thereof is disposed adjacent to the back plate 16 and is firmly secured to the rotor shaft 32 between two collars 33 carried by said shaft.

The shaft is provided with oppositely extending trunnion pin portions 34 and 35 which have pivotal mounting in apertured bearing plugs 36 and 37, respectively. The sleeve-like core 25 is threaded internally and the bearing plug 36 is screwed into place through the open front end of this core. The other bearing plug 37 similarly screws into the threaded end of a bearing sleeve 38. The inner end of said sleeve has an enlarged boss portion provided with an annular groove as indicated at 39, the back plate 16 having an outwardly dished portion 41 which seats in said groove and is secured therein by swaging the end of the boss portion outwardly over the inner side of the plate. The rotor shaft 32 carries a pinion 42, and one side of the bearing sleeve is cut away in the plane of the pinion, as indicated at 43, so that driving connection may be established between the pinion and an external gear.

Referring now to the construction of the pole portion of the stator, Figures 4 and 5 illustrate the construction and assembly of the stampings which are employed to make up a four pole construction of stator. Said construction comprises four U-shaped stampings 44, 45, 46 and 47. These stampings are composed of a magnetic metal, and the four stampings are all preferably exact duplicates. Each stamping comprises a diametrically extending flat portion 48, in the center of which is punched a relatively large hole 49. The ends of said diametrical strap portion are bent laterally in parallel relation to form the pole extensions 51.

These extensions are given a cylindrical curvature, preferably concentric with respect to the central hole 49, so that when the stampings are assembled over the coil 26, the pole extensions 51 can closely embrace the cylindrical outer surface of the coil. Two of said stampings are assembled over the coil 26 from one side thereof, and the other two stampings are assembled over the coil from the other side. Thus, in Fig. 4, the two stampings 44 and 45 are assembled over the outer or front end of the coil, and the other two stampings 46 and 47 are assembled over the rear end of the coil. The stamping 45 is disposed in close proximity to the coil, and the companion stamping 44 is thereafter assembled over the outer side of the stamping 45, with two stampings crossed or offset from each other at an angle. The two opposite stampings 46 and 47 are similarly arranged, with the stamping 46 disposed practically against the end or side of the coil and the companion stamping 47 disposed outside thereof and at an angle thereto. The angular relation between the four stampings is such that the two innermost stampings 45 and 46, which lie substantially against the ends of the coil, are disposed at right angles to each other, and the two outermost stampings 44 and 47 are also disposed at right angles to each other, but with these latter stampings offset symmetrically with respect to the inner stampings. Thus, pole portions 51 of the series of stampings are all equally spaced circumferentially about the coil 26, the under sides of these pole portions being slightly spaced radially from the peripheral surface of the coil. The stampings all being duplicates, it will be evident that the outer cylindrical surfaces of the several pole extensions 51 will all be concentric.

Prior to the assembly of both pairs of stampings, a ring-like plate or washer 52 is interposed between the stampings 44 and 45. A similar ring or washer 53 is interposed between the stampings 46 and 47, both of these rings having central openings 54 therein aligning with the openings in the stampings.

Such rings or washers function as lag elements, being composed of copper or some other metal suitable to this purpose. Referring now to the manner of securing these parts to the central core 25, it will be observed from Fig. 3 that the inner end of the core 25 is formed with a reduced annular portion 55 defining the shoulder 56. The inner stamping 46 is first slipped over this reduced portion and is brought to bear against the shoulder 56. Thereafter the copper washer 53 is assembled over the reduced portion and the companion stamping 47 is placed over the outer side of the washer. Thereupon the end of the core 25 is rolled or beaded outwardly to form the flange or bead 57 which extends over the outer side of the stamping 47 and rigidly binds the two stampings and the washer in locked relation against the shoulder 56. The winding 26 has been previously mounted on the core 25, or is mounted on the core at this time. The two other stampings 44 and 45, together with the interposed washer 52 are secured to the other end of the core member 25 in similar fashion. This end of the core is also formed with a reduced annular extension 55' at the inner end of which is formed the radial shoulder 56'. The stamping 45, washer 52 and stamping 44 are slipped over this reduced portion with the stamping 45 bearing against the shoulder 56'. The end plate 15 is then placed over the outer side of the stamping 44, and thereupon the end of the core 25 is rolled or spun outwardly to form the retaining bead or flange 57', which engages over the outer side of the end plate 15 and forces this assembly of elements into firm engagement with the shoulder 56'.

Fig. 4 illustrates the front end of the assembly, prior to the placing of the end plate 15 over the reduced core portion 55' and prior to the outward beading of this end of the core over the end plate. It will be seen from the foregoing that this manner of assembling the stampings, core, coil, etc., is simple and inexpensive, and rigidly binds the several stampings against the possibility of angular displacement. The stator assembly is all mounted on the front plate 15 which is held in fixed relation to the back plate 16 by the cylindrical shell 14, it being observed from Figure 3 that the ends or edges of this shell engage in grooves 59 and 61 formed in the opposing faces of the two plates.

If it is desired to construct the stator with only two poles, stampings of the general construction indicated at 63 in Figure 6 are employed in lieu of the U-shaped stampings previously described. The relatively wide pole extension of this stamping is slotted transversely intermediate the ends thereof, as indicated at 64. This simplifies shaping the relatively wide pole face and also avoids parasitic eddy currents therein.

If it is desired to construct a six pole stator, stampings of the construction indicated at 67 in Figure 7 are employed. It will be noted that these stampings have three equidistantly spaced pole extensions of comparatively narrow width.

If it is desired to construct an eight pole stator, stampings of the construction indicated at 69 in Figure 8 are employed, such stampings having four equidistantly spaced pole extensions of comparatively narrow width extending therefrom. It will also be noted that this principle can be extended to motors having even a greater number of poles.

In each of the modified constructions illustrated in Figures 6, 7 and 8, it will be understood that the copper lag plates 52 and 53, or equivalent elements, will be interposed between the stampings of each companion pair for obtaining the necessary lagging relation between the flux in the two stampings. The flux paths and the lagging relation between the fluxes in the case of all of the embodiments shown will be understood from the following description of the flux characteristics of the four-pole construction illustrated in Figures 3, 4 and 5.

At any given instant, the pole extensions of the stamping 45 will have one polarity and the pole extensions of the opposite stamping 46 will have the opposite polarity, inasmuch as these stampings are disposed on opposite ends or sides of the coil 26. Because of the presence of the copper washers 52 and 53, the flux in the two outer stampings 44 and 47 will differ in time phase relation to the flux in the inner stampings 45 and 46 which are adjacent to the coil. That is to say, the flux in the pole extensions of the stamping 44 will lag behind the flux in the pole extensions of the stamping 45, and similarly the flux in the pole extensions of the stamping 47 will lag behind the flux in the extensions of the stamping 46.

There is, therefore, created within the annular air gap 28 an alternating current rotating field, which is greatly strengthened by the presence of the cylindrical magnetic return path afforded by the metallic shell 14. This rotating field interacts with the rotor 29, causing rotation of the latter in a manner well known.

The various vector relations between the applied voltage and the fluxes cooperating to produce the desired rotating field in the air gap will be readily understood from Figure 9 in which $\phi$ represents the magnitude and phase of the total flux associated with the stampings 45 and 46 adjacent to the coil 26. $\phi'$ represents the total flux in magnitude and phase emanating from the outer stampings 44 and 47 which are spaced from the inner stampings by the copper lag plates 52 and 53, the design of the latter being so proportioned that the flux $\phi'$ is approximately equal to $\phi$ in magnitude but lags behind this flux by approximately 90° as shown. It has been found that this choice of magnitudes and vector relations produces the maximum driving effect upon the rotor 29. It will, therefore, be seen that the total useful flux interlinking with the magnetizing coil 26 is hence the sum of these two fluxes, or $\phi_0$. Such flux interlinking with the coil 26 requires the application of voltage E in quadrature with $\phi_0$ to maintain the necessary magnetizing current $I_0$.

To this there must be added the voltage necessary to overcome the resistance and leakage reactance drop $I_oR$ and $I_oX$ respectively of the energizing winding, giving Et as a total applied voltage in magnitude and phase. As shown in Figure 9, the flux $\emptyset'$ is almost in quadrature with $\emptyset$. Any particular set of copper lag plates usually leaves $\emptyset_0$ unaltered, the effect of changing the thickness of each lag plate being merely to cause $\emptyset'$ to lag to a greater degree behind $\emptyset_0$ and at the same time to advance $\emptyset$ by an almost equal amount. With the flux relation shown in Figure 9 it will be evident that the space relation between the various stampings and the time phase relation between the various fluxes produces the necessary and required relation for giving the maximum driving effect to the rotor.

While the use of the copper lag plates 52 and 53 constitutes the preferred arrangement for obtaining the necessary phase relations between the various fluxes, it will be understood that the invention is not to be limited thereto as other arrangements may also be employed. For example, these copper plates may be substituted by coils of generally similar shaped, the terminals of which are connected to a suitable resistance. Figure 10 diagrammatically illustrates such arrangement, wherein the two coils which have been substituted for the copper plates are designated 52' and 53'. The resistance to which these coils are connected is indicated at 71. Another modified arrangement is illustrated in Figure 11, in which these same coils 52' and 53' are connected in series with the field coil 26 and are also shunted by a resistance 71 and a suitable condenser 72.

When such coils are to be used they are wound in flat ring-like form so that they can be interposed between the two pole stampings of each pair in the same positions occupied by the copper lag plates 52 and 53 of the preceding embodiment. Fig. 12 illustrates one of these coils in enlarged section. The coil, which is designated 52', is wound over an insulating core 74 such as bakelite, and is confined between insulating washers 75. This assembly is mounted on a suitable metallic spacing ring 76 having an axial thickness corresponding to the thickness of the coil 52' together with its washers 75. Thus when the coil units are placed between the stampings 44—45 and between the stampings 46—47, and the ends of the core 25 are flanged over as indicated at 57—57', the spacing rings 76 of each coil unit sustain the pressures created by these flanging operations and prevent the coils from being crushed. The two terminal ends of each coil are suitably connected with the resistance 71 illustrated in Fig. 10, or with the resistance 71 and capacity 72 illustrated in Fig. 11.

It will be seen that the invention is capable of considerable modification and rearrangement of its constituent elements, and accordingly I do not intend to be limited to the specific constructions shown except as these constructions are defined in the appended claims.

I claim:

1. An alternating current motor of the induction type comprising a field coil, a plurality of pole members extending from each end of the coil and having pole extensions embracing the coil, a circular magnetic return path spaced from said pole extensions by an annular air gap, a cup-shaped rotor arranged to rotate in said air gap, and lag elements disposed between said pole members at each end of said coil for cooperating with the pole extensions and the magnetomotive force in said coil to establish a rotating field in said air gap.

2. An alternating current motor of the induction type comprising a field coil, a core element therein, a pair of pole members extending from each end portion of said core element and having a plurality of pole extensions embracing the coil, a circular magnetic return path spaced from said pole extensions by an annular air gap, a cup-shaped rotor arranged to rotate in said air gap, and lag elements disposed between each of said pairs of pole members for assisting said pole extensions and coil in establishing a rotating field in said air gap.

3. An alternating current motor of the induction type comprising a cylindrical field coil, a core element therein, a plurality of pole members mounted on opposite end portions of said core element and extending outwardly along the ends of said coil, said members having pole extensions projecting across the cylindrical outer surface of the coil, a circular magnetic return path spaced from said pole extensions by an annular air gap, a cup-shaped rotor arranged to revolve in said air gap, and lag elements interposed between the pole members at each end of the coil for lagging the flux in certain of said pole extensions to establish a rotating field in said air gap.

4. An alternating current motor of the induction type comprising a field coil, a pair of sheet metal stampings at opposite ends of the coil having pole extensions embracing the coil, a cup-shaped rotor embracing said coil and revolving in proximity to said pole extensions, and lag elements disposed between said pairs of stampings for shading said poles to establish a rotating field between said pole extensions.

5. An alternating current motor of the induction type comprising a field coil, a core element therein, a pair of sheet metal stampings extending from the end portions of said core element each having a plurality of pole extensions embracing the coil, lag elements disposed between said pairs of stampings for lagging the flux driven through one of the pair of poles to establish a rotating field around said pole extensions, and a cup-shaped rotor embracing said pole extensions and being acted upon by said rotating field.

6. An alternating current motor of the induction type comprising a cylindrical field coil, a core element therefore, a plurality of sheet metal stampings mounted on the opposite ends of said core element and extending outwardly along the ends of the coil, said stampings having laterally bent pole extensions extending across the peripheral surface of the coil in spaced relation, lag elements mounted between the stampings at each end of said coil for shading the flux from the coil to produce a rotating field around said coil, and a cup-shaped rotor embracing said pole extensions and revolving in said rotating field.

7. An alternating current motor of the induction type comprising a field coil, a pair of sheet metal stampings extending outwardly at the ends of the coil and having a plurality of laterally bent pole extensions embracing the coil, a cylindrical rotor embracing said pole extensions, and copper lag plates disposed between said pairs of stampings for retarding part of the flux in said air gap to produce the necessary rotating field for driving said rotor.

8. An alternating current motor of the induction type comprising a field coil, a pair of sheet metal stampings at each end of this coil, both pairs of stampings having laterally bent pole extensions embracing the coil from opposite sides or ends thereof, a cup-shaped rotor embracing said pole extensions, and copper lag plates interposed between the individual stampings of each pair for controlling the flux through one of said stampings to provide the necessary rotating field for driving said rotor.

9. An alternating current motor of the induction type comprising a field coil, U-shaped stampings at opposite sides of the coil having their laterally bent ends embracing the coil in the relation of poles, a circular magnetic return path spaced from said poles by an annular air gap, a cup-shaped rotor arranged to revolve in said air gap, and lag elements disposed between the stampings at each end of said coil as an aid to it in establishing a rotating field in said gap.

10. An alternating current motor of the induction type comprising a circular field coil, a core element therein, a pair of U-shaped stampings mounted on said core element at each side of said coil, said stampings having their laterally bent ends embracing the peripheral surface of the coil in the relation of circumferentially spaced poles, a circular magnetic return path spaced from said poles by an annular air gap, a cup-shaped rotor arranged to revolve in said air gap, and copper lag plates interposed between the individual stampings of each pair.

11. An alternating current motor of the induction type comprising a field coil, a core therein, sheet metal stampings mounted on said core at each end of the coil, said stampings having holes therein engaging over said core and bearing against shoulders thereon, the ends of said core being rolled outwardly over the outer sides of said stampings, said stampings having laterally bent pole extensions embracing said coil, and a cup-shaped rotor embracing said pole extensions.

12. An alternating current motor of the induction type comprising a field coil, a core therein, a pair of sheet metal stampings and an interposed copper lag plate mounted on said core at each end of the coil, the two stampings and lag plate having apertures therein engaging over the end of the core and bearing against a shoulder thereon, the ends of said core being beaded outwardly over the outermost stamping of each pair, said stampings having laterally bent pole extensions embracing the peripheral surface of the coil, a circular magnetic return path spaced from said pole extensions by an annular gap, and a cup-shaped rotor arranged to revolve in said air gap.

13. In an alternating current motor of the induction type, the combination of front and back non-magnetic end plates, a cylindrical magnetic shell between said end plates, a hollow magnetic core secured to said front plate and disposed centrally with respect to said circular shell, a field coil mounted on said core, sheet metal stampings mounted in pairs on said core at opposite ends of said coil and having laterally bent pole extensions embracing the peripheral surface of the coil, said circular shell being spaced from said pole extensions by an annular air gap, a cup shaped rotor arranged to revolve in said air gap, copper lag plates interposed between the individual stampings of each pair for shading one of the pair to create a rotating field in said air gap, a shaft for said rotor, a bearing for one end of said shaft mounted in said hollow core, and a bearing for the other end of said shaft supported by said back plate.

In witness whereof, I hereunto subscribe my name this 10th day of May, 1928.

WERNER KOENIG.